(12) United States Patent
Wang (10) Patent No.: US 10,567,241 B2
(45) Date of Patent: Feb. 18, 2020

(54) SERVICE ORCHESTRATION METHOD AND APPARATUS IN SOFTWARE-DEFINED NETWORKING, AND STORAGE MEDIUM

(71) Applicant: ZTE CORPORATION, Shenzhen (CN)

(72) Inventor: Dong Wang, Shenzhen (CN)

(73) Assignee: ZTE CORPORATION, Shenzhen, Guangdong (CN)

( * ) Notice: Subject to any disclaimer, the term of this patent is extended or adjusted under 35 U.S.C. 154(b) by 337 days.

(21) Appl. No.: 15/322,152

(22) PCT Filed: Feb. 11, 2015

(86) PCT No.: PCT/CN2015/072806
§ 371 (c)(1),
(2) Date: Apr. 19, 2017

(87) PCT Pub. No.: WO2015/196813
PCT Pub. Date: Dec. 30, 2015

(65) Prior Publication Data
US 2017/0244611 A1   Aug. 24, 2017

(30) Foreign Application Priority Data
Jun. 26, 2014   (CN) .......................... 2014 1 0295198

(51) Int. Cl.
*H04L 12/24* (2006.01)
*H04L 12/14* (2006.01)
*H04L 29/08* (2006.01)

(52) U.S. Cl.
CPC ...... *H04L 41/5025* (2013.01); *H04L 12/1435* (2013.01); *H04L 41/0856* (2013.01);
(Continued)

(58) Field of Classification Search
CPC . H04L 41/5025; H04L 12/14; H04L 12/1435; H04L 41/0856; H04L 41/0873;
(Continued)

(56) References Cited

U.S. PATENT DOCUMENTS

2002/0165957 A1* 11/2002 Devoe ................. H04L 43/50
                                                    709/224
2009/0119673 A1*  5/2009 Bubba ................. G06F 9/50
                                                    718/104
(Continued)

FOREIGN PATENT DOCUMENTS

CN    101877703 A    11/2010
CN    102222005 A    10/2011
(Continued)

OTHER PUBLICATIONS

Martini et al. An SDN orchestrator for resources chaining in cloud data centers, 2014 Europen conference on networks and communications (EUCNC), IEEE, Jun. 23, 2014, pp. 1-5.*
(Continued)

*Primary Examiner* — Patrice L Winder
*Assistant Examiner* — Aye M Aung
(74) *Attorney, Agent, or Firm* — Cantor Colburn LLP (57) ABSTRACT

A service orchestration method and apparatus in SDN, and a storage medium are described. The method includes: determining whether a current SDN open network platform resource meets an SDN open network platform resource requested by an SDN application after receiving a request of using the SDN open network platform resource sent from the SDN application via an external application interface, determining whether an application engine function module and an application extension function module meet an execution of the SDN application when the requested resource is met, and loading an application engine function
(Continued)

of the application engine function module or an application extension function of the application extension function module when meeting; and applying for the resource required by the SDN application from a controller layer of the SDN, and allocating the applied resource to the loaded application engine function or application extension function.

11 Claims, 4 Drawing Sheets

(52) U.S. Cl.
CPC .......... H04L 41/0873 (2013.01); H04L 41/20 (2013.01); H04L 41/5054 (2013.01); H04L 69/329 (2013.01)

(58) Field of Classification Search
CPC . H04L 41/20; H04L 41/5051; H04L 41/5054; H04M 15/00; H04M 15/66; H04W 4/24
See application file for complete search history.

(56) References Cited

U.S. PATENT DOCUMENTS

| | | | | |
|---|---|---|---|---|
| 2010/0014431 A1* | 1/2010 | Bajpay | .................... | H04L 41/06 370/242 |
| 2011/0185366 A1* | 7/2011 | Klingenberg | ......... | G06F 9/5088 718/105 |
| 2013/0144973 A1 | 6/2013 | Li et al. | | |
| 2014/0032712 A1* | 1/2014 | Webster | .................. | H04L 67/02 709/217 |
| 2015/0063802 A1* | 3/2015 | Bahadur | ............... | H04L 47/125 398/49 |
| 2015/0372902 A1* | 12/2015 | Giorgetti | ................. | H04L 45/64 370/219 |
| 2016/0006623 A1 | 1/2016 | Liu et al. | | |
| 2016/0073278 A1* | 3/2016 | Roessler | ................. | H04L 49/70 370/252 |
| 2016/0308905 A1* | 10/2016 | Stiekes | .................... | H04L 47/20 |
| 2017/0006082 A1* | 1/2017 | Shishodia | ............. | H04L 67/025 |

FOREIGN PATENT DOCUMENTS

| | | |
|---|---|---|
| CN | 103051629 | 4/2013 |
| CN | 103139265 | 6/2013 |
| CN | 103269282 | 8/2013 |
| CN | 103346922 | 10/2013 |
| EP | 2765751 | 8/2014 |

OTHER PUBLICATIONS

Extend European Search Report for EP 15812865.2, completed by the European Patent Office dated May 26, 2017 All together 8 Pages.
Bueno et al., 7 Pages,"An OpenNaas based SDN Framework for Dynamic QoS control".
Martini et al., 5 Pages,"An SDN Orchestrator for Resources Chaining in Cloud Data Centers".
Office Action dated Jun. 5, 2019 for corresponding Chinese Application No. 201410295198.0.
International Search Report for PCT/CN2014/072806, English Translation attached to original, Both completed by the Chinese Patent Office dated Apr. 29, 2015, All together 5 Pages.

* cited by examiner

FIG. 1

Determine whether a current SDN open network platform resource meets a resource requested by an SDN application or not after receiving a request of using the SDN open network platform resource sent from the SDN application via an external application interface, further determine whether an application engine function module and an application extension function module meet an execution of the SDN application or not when the resource requested by the SDN application can be met, and load an application engine function corresponding to the application engine function module or an application extension function corresponding to the application extension function module when the execution of the SDN application is met — 201

Apply for the resource required by the SDN application from a controller layer according to the request of the SDN application, and allocate the applied resource to the loaded application engine function or application extension function — 202

Perform charging according to the resource consumed by the SDN application and a pricing strategy and pricing mechanism of the SDN application, generate a bill, and output a bill result — 203

SERVICE ORCHESTRATION METHOD AND APPARATUS IN SOFTWARE-DEFINED NETWORKING, AND STORAGE MEDIUM

CROSS-REFERENCE TO RELATED APPLICATION

This application is the U.S. national phase of PCT Application No. PCT/CN2015/072806 filed Feb. 11, 2015, which claims priority to Chinese Application No. 201410295198.0 filed Jun. 26, 2014, the disclosures of which are incorporated in their entirety by reference herein.

TECHNICAL FIELD

The present document relates to a service orchestration technology, and more particularly to a service orchestration method and apparatus in Software Defined Networking (SDN) and a storage medium.

BACKGROUND OF THE RELATED ART

The SDN is a new network technology emerging in recent years, and its main characteristics include control and forwarding separation, network openness and programmability, as well as software and hardware separation. The SDN enables a conventional communication network equipment to be liberated from the dedicated hardware binding, thereby developing toward the direction based on a universal hardware platform plus customized software. The network function virtualization, network management simplification and network deployment automation are implemented through an open programmable interface. Thus, compared with conventional network function realization and engineering implementation, equipment cost and labor cost are greatly reduced, and deployment time is saved.

Figure 1:
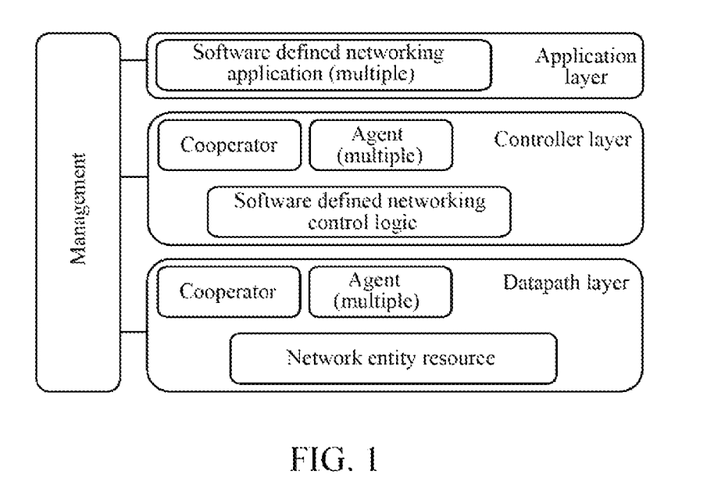
FIG. 1 is an architecture diagram of a software defined networking according to the related art.

FIG. 1 is an architecture diagram of a software defined networking according to the related art. As shown in FIG. 1, the software defined networking technology is divided according to its architecture hierarchy, and is substantially divided into three layers from top to bottom: an application plane (or application layer), a controller plane (or controller layer) and a data plane or (datapath layer). At present, the industry discusses more about the controller layer and the datapath layer, and is being performing or has performed a large amount of standardization work, but the application layer and its internal structure, particularly how to perform application integration, management and control and how the services are orchestrated and interface with the controller layer, and the like, are discussed less and also developed relatively more slowly. This will cause deficiencies of capabilities of SDN in terms of usability, openness, programmability, manageability, operability, and the like, and disadvantages in healthy development of the SDN industry. In particular, there is a congenital obstacle on how to rapidly establish an SDN developer community and attract a large number of SDN application developers.

An application layer of the SDN currently defined by either the Open Networking Foundation (ONF) standard organization or the Open Day Light (ODL) open source organization is mainly positioned as providing highly abstract functions such as network applications and network service orchestration, etc. The application layer of the SDN may perform network resource application and service orchestration according to a user application request. In an uplink direction, the application layer of the SDN provides Application Programming Interface (API) call (arctic interface, also called application interface) with an external user in a Representational State Transfer (REST) manner, and a customized application function is realized for the external user, to realize a virtual network application function. In a downlink direction, the application layer of the SDN provides network API interface call (northbound interface) with an SDN controller in the REST manner and performs a resource application to the controller layer of the SDN to realize a virtual network service function.

At present, even from the point of the application layer of the SDN, most of its related technical discussions and standard work focus on an aspect of the northbound interface between the application layer of the SDN and the controller layer of the SDN. During a practical application of the SDN, the services provided by the SDN to the external side are mainly implemented through the interface of the application layer of the SDN and its external upper-layer application (i.e., arctic interfaces) and the orchestration function within the application layer of the SDN. At present, a functional requirement related to the arctic interface and a functional requirement related to the orchestration have not yet been fully excavated. Particularly, a specific functional architecture for network service orchestration and which specific functions should be provided have not yet been defined and perfected, which hinders integration of the SDN application and further influences development of the SDN application to a certain extent.

For the abovementioned problem of how to orchestrate SDN services by the application layer of the SDN, there is no related technology for reference yet.

SUMMARY

In order to solve the abovementioned technical problem, embodiments of the present document provides a service orchestration method and apparatus in a software defined networking and a storage medium, which can apply corresponding resources for an application according to a service request of the application and determine a corresponding application engine or application extension function for the application, thereby implementing orchestration of SDN services.

The technical solutions of the embodiments of the present document are implemented as follows.

A service orchestration method in a Software Defined Networking, SDN, includes:

determining whether a current SDN open network platform resource meets an SDN open network platform resource requested by an SDN application or not after receiving a request of using the SDN open network platform resource sent from the SDN application via an external application interface, further determining whether an application engine function and an application extension function meet an execution of the SDN application or not when the resource requested by the SDN application is met, and loading the application engine function or the application extension function when the execution of the SDN application is met; and applying for the resource required by the SDN application from a controller layer of the SDN according to the request of the SDN application, and allocating the applied resource to the loaded application engine function or application extension function.

As an implementation mode, the method further includes:

performing charging according to the resource consumed by the SDN application and a pricing strategy and pricing mechanism of the SDN application, generating a bill, and outputting a bill result.

As an implementation mode, before receiving a request of using the SDN open network platform resource sent from the SDN application via an external application interface, the method further includes:

initializing orchestration management information, orchestration backup information and orchestration extension information in the SDN, and setting an initial state; and acquiring network synchronization information from the controller layer.

As an implementation mode, after allocating the applied resource to the loaded application engine function or application extension function, the method further includes:

maintaining a current running state, keeping information synchronization with the controller layer, managing orchestration information, backing up the orchestration information, monitoring whether an orchestration extension operation is required to be performed or not, and performing a corresponding orchestration extension when the orchestration extension operation is required to be performed.

A service orchestration apparatus in a Software Defined Networking, SDN, is provided, the SDN includes an application layer and a controller layer, herein an application engine function module and an application extension function module are disposed in the application layer, herein, the application engine function module is arranged to provide an application engine capability for the application layer of the SDN, and the application extension function module is arranged to extend a core function of the controller layer to provide an application; and, the apparatus includes: a receiving unit, a first determination unit, a second determination unit, a loading unit and a resource applying unit, herein, the receiving unit is arranged to trigger the first determination unit after receiving a request of using an SDN open network platform resource sent from an SDN application via an external application interface;

the first determination unit is arranged to determine whether a current SDN open network platform resource meets the resource requested by the SDN application or not, and trigger the second determination unit when the resource requested by the SDN application is met;

the second determination unit is arranged to determine whether the application engine function module and the application extension function module meet an execution of the SDN application or not, and trigger the loading unit when the execution of the SDN application is met;

the loading unit is arranged to load an application engine function corresponding to the application engine function module or an application extension function corresponding to the application extension function module; and the resource applying unit is arranged to apply for the resource required by the SDN application from the controller layer according to the request of the SDN application, and allocate the applied resource to the loaded application engine function or application extension function.

As an implementation mode, the apparatus further includes:

a bill processing unit, arranged to perform charging according to the resource consumed by the SDN application and a pricing strategy and pricing mechanism of the SDN application, generate a bill, and output a bill result.

As an implementation mode, the apparatus further includes:

an initialization unit, arranged to initialize orchestration management information, orchestration backup information and orchestration extension information in the SDN, and set an initial state; and acquire network synchronization information from the controller layer.

As an implementation mode, the apparatus further includes:

an orchestration management unit, arranged to maintain a current running state, keep information synchronization with the controller layer, manage orchestration information, back up the orchestration information, monitor whether an orchestration extension operation is required to be performed or not, and perform corresponding orchestration extension when the orchestration extension operation is required to be performed.

A storage medium is provided, storing a computer program, arranged to execute the abovementioned service orchestration method in the software defined networking.

In the embodiments of the present document, the application engine function module and the application extension function module are arranged in the application layer. Herein, the application engine function module is arranged to provide the application engine capability for the application layer of the SDN; the application extension function module is arranged to extend the core function of the controller layer to provide the application. Whether the current SDN open network platform resource meets the resource requested by the SDN application or not is determined after the request of using the SDN open network platform resource sent from the SDN application via the external application interface is received. Whether the application engine function module and the application extension function module meet the execution of the SDN application or not is further determined when the resource requested by the SDN application can be met. The application engine function corresponding to the application engine function module or the application extension function corresponding to the application extension function module is loaded when the execution of the SDN application is met. The resource required by the SDN application is applied for from the controller layer according to the request of the SDN application, and the applied resource is allocated to the loaded application engine function or application extension function. The charging is performed according to the resource consumed by the SDN application and the pricing strategy and pricing mechanism of the SDN application, the bill is generated and the bill result is output. According to the embodiments of the present document, a corresponding resource is applied for an application according to a service request of the application, and a corresponding application engine or application extension function is determined for the application, thereby implementing orchestration of an SDN service. By the embodiments of the present document, quality of the SDN service is improved, and better service experiences are provided for the user.

DETAILED DESCRIPTION

In order to make a purpose, a technical solution and an advantage of the present document clearer, the present document is further described in detail below with examples and with reference to the accompanying drawings.

Figure 2:
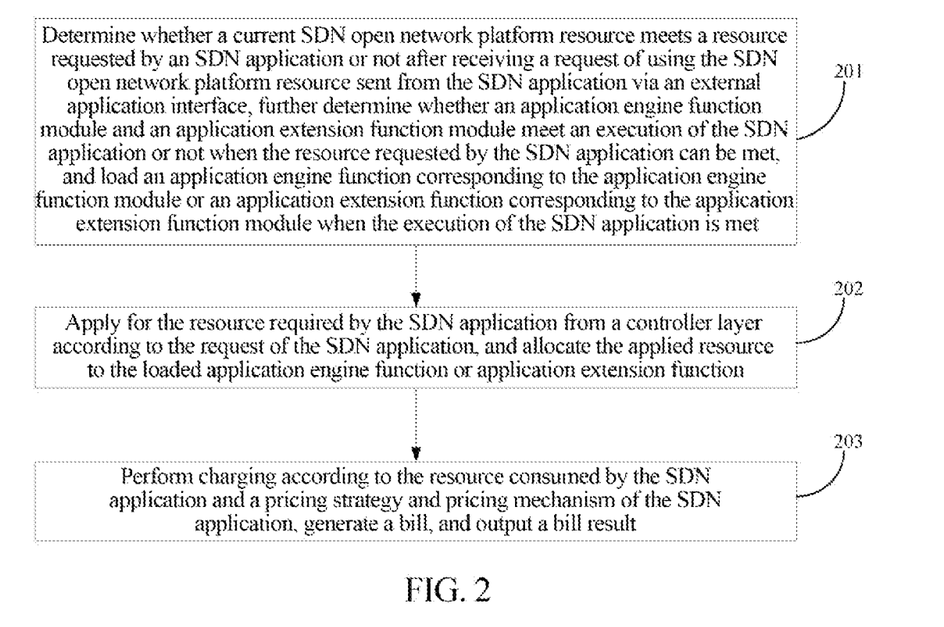
FIG. 2 is a flowchart of a service orchestration method in a software defined networking according to an embodiment of the present document.

FIG. 2 is a flowchart of a service orchestration method in a software defined networking according to an embodiment of the present document. As shown in FIG. 2, in the service orchestration method in the software defined networking in the example, the SDN includes an application layer and a controller layer, and an application engine function module and an application extension function module are disposed in the application layer. Herein, the application engine function module is arranged to provide an application engine capability for the application layer of the SDN, and the application extension function module is arranged to extend a core function of the controller layer to provide an application. The service orchestration method in the software defined networking in the example includes the following steps.

Step 201: it is determined whether a current SDN open network platform resource meets a resource requested by an SDN application or not after receiving a request of using the SDN open network platform resource sent from the SDN application via an external application interface, it is further determined whether the application engine function module and the application extension function module meet an execution of the SDN application or not when the resource requested by the SDN application can be met, and an application engine function corresponding to the application engine function module or an application extension function corresponding to the application extension function module are loaded when the execution of the SDN application is met.

Before step 201, the method further includes: orchestration management information, orchestration backup information and orchestration extension information in the SDN are initialized, and an initial state is set; and network synchronization information is acquired from the controller layer.

Step 202: the resource required by the SDN application is applied for from the controller layer according to the request of the SDN application, and the applied resource is allocated to the loaded application engine function or application extension function.

After the applied resource is allocated to the loaded application engine function or application extension function, the method further includes: a current running state is maintained, information synchronization with the controller layer is kept, orchestration information is managed, the orchestration information is backed up, and it is monitored whether an orchestration extension operation is required to be performed or not, and a corresponding orchestration extension is performed when the orchestration extension operation is required to be performed.

Step 203: charging is performed according to the resource consumed by the SDN application and a pricing strategy and pricing mechanism of the SDN application, a bill is generated, and a bill result is output.

Figure 3:
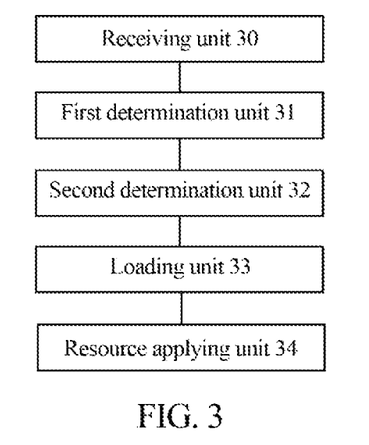
FIG. 3 is a structure diagram of a service orchestration apparatus in a software defined networking according to an embodiment of the present document.

FIG. 3 is a structure diagram of a service orchestration apparatus in a software defined networking according to an embodiment of the present document. As shown in FIG. 3, the SDN includes an application layer and a controller layer, and the service orchestration apparatus in the software defined networking in the example is applied into the application layer of the SDN. An application engine function module and an application extension function module are disposed in the application layer. Herein, the application engine function module is arranged to provide an application engine capability for the application layer of the SDN, and the application extension function module is arranged to extend a core function of the controller layer to provide an application. The apparatus includes: a receiving unit 30, a first determination unit 31, a second determination unit 32, a loading unit 33 and a resource applying unit 34. The receiving unit 30 is arranged to trigger the first determination unit 31 after receiving a request of using an SDN open network platform resource sent from an SDN application via an external application interface.

The first determination unit 31 is arranged to determine whether a current SDN open network platform resource meets the resource requested by the SDN application or not, and trigger the second determination unit 32 when the resource requested by the SDN application can be met.

The second determination unit 32 is arranged to determine whether the application engine function module and the application extension function module meet an execution of the SDN application or not, and trigger the loading unit 33 when the execution of the SDN application is met.

The loading unit 33 is arranged to load an application engine function corresponding to the application engine function module or an application extension function corresponding to the application extension function module.

The resource applying unit 34 is arranged to apply for the resource required by the SDN application from the controller layer according to the request of the SDN application, and allocate the applied resource to the loaded application engine function or application extension function.

Based on the apparatus shown in FIG. 3, the apparatus further includes: a bill processing unit (not shown in FIG. 3), arranged to perform charging according to the resource consumed by the SDN application and a pricing strategy and pricing mechanism of the SDN application, generate a bill, and output a bill result.

Based on the apparatus shown in FIG. 3, the apparatus further includes: an initialization unit (not shown in FIG. 3), arranged to initialize orchestration management information, orchestration backup information and orchestration extension information in the SDN, and set an initial state; and acquire network synchronization information from the controller layer.

Based on the apparatus shown in FIG. 3, the apparatus further includes: an orchestration management unit (not shown in FIG. 3), arranged to maintain a current running state, keep information synchronization with the controller layer, manage orchestration information, back up the orchestration information, monitor whether an orchestration extension operation is required to be performed or not, and perform corresponding orchestration extension when the orchestration extension operation is required to be performed.

Various processing units and processing modules in the service orchestration apparatus in the abovementioned software defined networking in the embodiment of the present document may be implemented by a computer program unit. The computer program unit may be stored in a storage medium, and a processor may execute the computer program unit. For a distributed computing scenario such as cloud computing and the like, the abovementioned program unit may be stored in multiple storage media, and may be cooperatively executed by different processors.

Figure 4:
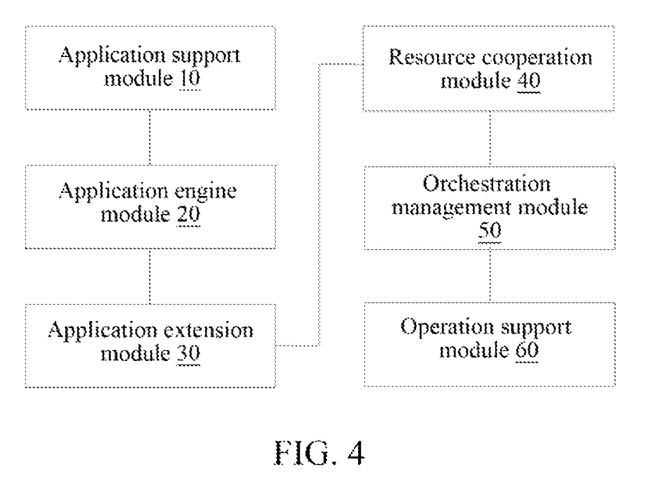
FIG. 4 is a schematic diagram of an implementation structure of a service orchestration apparatus in a software defined networking according to an embodiment of the present document.

FIG. 4 is a schematic diagram of an implementation structure of a service orchestration apparatus in a software defined networking according to an embodiment of the present document. As shown in FIG. 4, the service orchestration apparatus in the software defined networking in the example is mainly implemented by the following processing modules: an application support module 10, an application engine module 20, an application extension module 30, a resource cooperation module 40, an orchestration management module 50 and an operation support module 60. The application support module 10 is mainly arranged to integrate, manage and control SDN applications, and includes at least one of the following functions: application registration, application deregistration, application updating, application reconfiguration, application notification, application discovery, application sensing, and application monitoring, and the like. The application engine module 20 is mainly arranged to provide a core application engine capability for the SDN application, and includes at least one of the following functions: basic network application functions of a tenant, a network, a subnet, a port and the like, and advanced network application functions of network topology, service migration, load balance, security protection, service emulation and the like. The application extension module 30 is mainly arranged to extend by using core functions of the controller or SDN bottom-layer network forwarding, or the like, to meet a requirement presented by a user, for example, a related function can be realized by installing a support plugin and a downloadable component. The resource cooperation module 40 is mainly arranged to select a bottom-layer controller according to a request of the SDN application and apply to the bottom-layer controller for a resource required by running of the application, and includes at least one of the following resources: a computing (server/virtual machine) resource, a storage resource, a network resource and the like. The orchestration management module 50 is mainly arranged for initialization of an orchestration function, maintenance of own state (such as initialization, information collection, working and suspension), a network controller information synchronization, an orchestration information management, an orchestration information backup, and an orchestration extension operation, and the like. The operation support module 60 is arranged to perform charging on the SDN application and the resource consumed by the application according to a pricing strategy of the SDN application and the resource (including computing, storage and network) consumed by the SDN application and combining with an SDN operation mode and the like, and realize a function of bill output and the like with an external Operation Support System (OSS) interface.

Specifically, the application support module 10 is arranged to integrate, manage and control SDN applications, and includes at least one of the following functions: application registration, application deregistration, application updating, application reconfiguration, application notification, application discovery, application sensing, and application monitoring, and the like.

The application engine module 20 is arranged to provide the core application engine capability for the SDN application, and includes at least one of the following functions: basic network application functions of a tenant, a network, a subnet, a port and the like, and advanced network application functions of network topology, service migration, load balance, security protection, service emulation and the like.

The application extension module 30 is arranged to extend by using core functions of the controller or SDN bottom-layer network forwarding, or the like, to meet a function of providing the application for the user, such as installation of the support plugin and the downloadable component.

The resource cooperation module 40 is arranged to select a bottom-layer controller according to a request of the SDN application and apply to the bottom-layer controller for a resource required by running of the application, and includes at least one of the following resources: a computing (server/virtual machine) resource, a storage resource, a network resource and the like.

The orchestration management module 50 is arranged for initialization of an orchestration function, maintenance of own state (such as initialization, information collection, working and suspension), a network controller information synchronization, an orchestration information management, an orchestration information backup, and an orchestration extension operation, and the like.

The operation support module 60 is arranged to perform charging on the SDN application and the resource consumed by the application according to a pricing strategy of the SDN application and the resource (including computing, storage and network) consumed by the SDN application and combining with an SDN operation mode and the like, and realize a function of bill output and the like with an external Operation Support System (OSS) interface.

The external interface includes a northbound interface connected with the bottom-layer SDN controller and an arctic interface (also called an application interface) connected with an upper-layer external application.

The service orchestration of the SDN can be implemented through the service orchestration apparatus in the SDN shown in FIG. 4.

Figure 5:
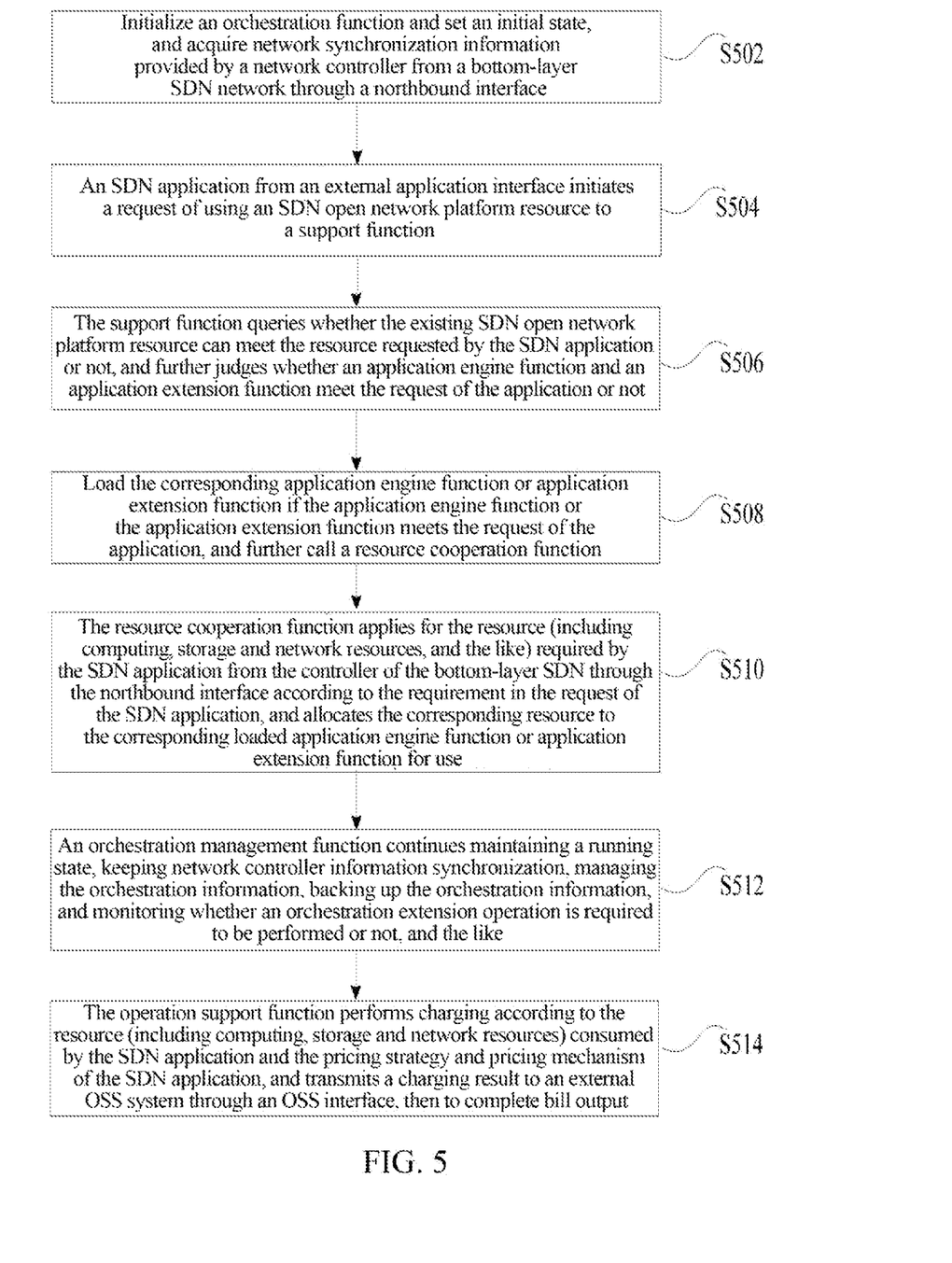
FIG. 5 is a flowchart of an implementation of an SDN service orchestration method according to an embodiment of the present document.

With reference to the service orchestration apparatus in the SDN shown in FIG. 4, an embodiment of the present document further elaborates the essence of the technical solution of the present document in combination with an implementation flowchart. FIG. 5 is a flowchart of an implementation of an SDN service orchestration method according to an embodiment of the present document. As shown in FIG. 5, the SDN service orchestration method of the example includes the following steps.

Step 502: an orchestration function is initialized (including initialization of orchestration management information, orchestration backup information and orchestration extension information), an initial state (such as initialization, information collection, working and suspension, etc.) is set, and network synchronization information provided by a network controller is acquired from a bottom-layer SDN through a northbound interface.

Step 504: an SDN application from an external application interface initiates a request of using an SDN open network platform resource to a support function.

Step 506: the support function queries whether the existing SDN open network platform resource can meet the resource requested by the SDN application or not, and further judges whether an application engine function and an application extension function meet the request of the application or not.

Step 508: the corresponding application engine function or application extension function is loaded if the application engine function or the application extension function meets the request of the application, and a resource cooperation function is further called.

Step 510: the resource cooperation function applies for the resource (including computing, storage and network resources, etc.) required by the SDN application from the controller of the bottom-layer SDN through the northbound interface according to the requirement in the request of the SDN application, and allocates the corresponding resource to the corresponding loaded application engine function or application extension function for use.

Step 512: an orchestration management function continues maintaining a running state, keeping network controller information synchronization, managing the orchestration information, backing up the orchestration information, and monitoring whether an orchestration extension operation is required to be performed or not, and the like.

Step 514: the operation support function performs charging according to the resource (including computing, storage and network) consumed by the SDN application and the pricing strategy and pricing mechanism of the SDN application, and transmits a charging result to an external OSS system through an OSS interface, then to complete bill output.

Figure 6:
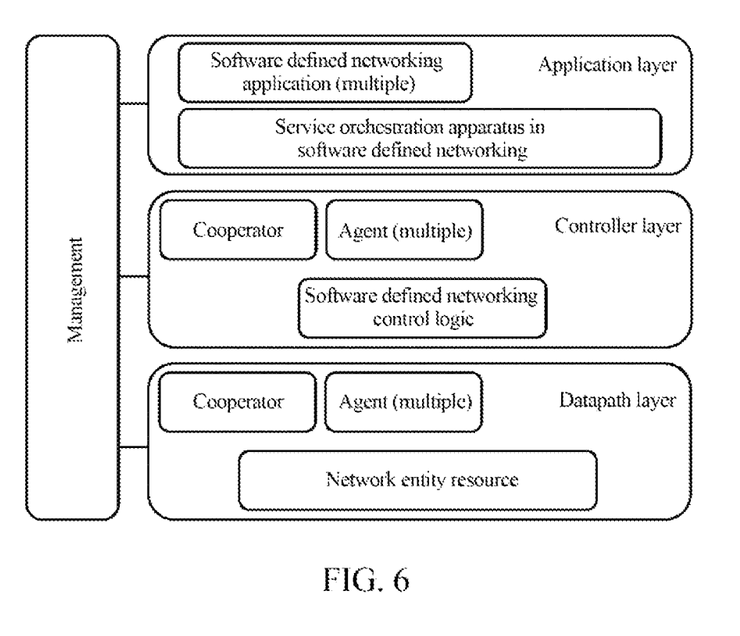
FIG. 6 is an architecture diagram of an SDN reference system according to an embodiment of the present document.

FIG. 6 is an architecture diagram of an SDN reference system according to an embodiment of the present document. As shown in FIG. 6, compared with an architecture of an existing SDN reference system, a service orchestration apparatus in the SDN is added in the application layer of the SDN in the embodiment of the present document. The function constructs a bridge between the application layer of the SDN and the controller layer of the SDN, eliminates differences of SDN controllers of each manufacturers, and provides an open application platform, a third-party application development and registration platform and a management and operation platform for a final user, an application developer and a manager, thereby further meeting SDN application, development, management, operation and maintenance requirements. This will also provide a basic platform and a facilitating condition for developing an SDN application store on the basis of the system to perform centralized trading, use, evaluation and the like of SDN applications.

In the embodiments of the present document, the service orchestration apparatus in the SDN constructs the bridge between the application layer of the SDN and the controller layer of the SDN, may completely eliminate differences of the early SDN controllers of various manufacturers so as to avoid locking of the controller manufacturers on one hand, and may also provide an open platform development and management capability for the final user, the application developer and the manager through an arctic (application) interface provided for an SDN application so as to further meet the SDN development, operation and maintenance requirements on the other hand.

By adding an application support function in the service orchestration apparatus in the SDN, integration, management and control for the SDN application are enhanced, the SDN application development performed by the SDN user with a network virtualization function is facilitated, and the application developer may learn that a bottom-layer network supports which network functions and does not support which network functions in advance and clearly knows whether a requirement presented by the SDN application may be met or not and probable costs therefore (such as a path, a bandwidth, traffic, a storage space, a time length, quality of service, service level and an expenditure, etc.).

By adding an application engine function in the service orchestration apparatus in the SDN, technology implementation details of the bottom-layer network are effectively shielded, and time required by the application development user for repeatedly developing a bottom-layer implementation technology is saved, so that the application development user may better concentrate on developing various applications without limits of familiarity with the bottom-layer technology.

By adding an application extension function in the service orchestration apparatus in the SDN, extensibility of the SDN application is improved, a mature solution may be rapidly released to the market for verification, and an immature solution may be continued to be evaluated and tested without influence on stability of the existing functions.

By adding a resource cooperation function in the service orchestration apparatus in the SDN, a bottom-layer controller may be effectively selected for the SDN application, and a proper resource (including a computing (server/virtual machine) resource, a storage resource, a network resource, and the like) may be applied for through the bottom-layer controller, thereby implementing maximization of resource utilization efficiency.

By adding an orchestration management function in the service orchestration apparatus in the SDN, an orchestration service may be effectively implemented (for example, through orchestration templating), secure and reliable running of the orchestration service may be effectively ensured, information backup may be effectively performed in case of downtime, and automatic capacity extension may be implemented in case of insufficient orchestration performance, and the like.

An operation support function module is also added in the service orchestration apparatus in the SDN, and is arranged to effectively perform charging and bill output on a resource used by the SDN application, thereby achieving operability and implementing sustained development of an SDN service.

By adding an external interface function, particularly a northbound interface connected with the bottom-layer SDN controller and an arctic interface (application interface) connected with an upper-layer external application, in the service orchestration apparatus in the SDN, development and using efficiency of the SDN application may be improved, and popularization, use and development of the SDN may be facilitated.

The embodiment of the present document further records a storage medium, in which a computer program is stored, and the computer program is arranged to implement the service orchestration methods in the SDN in the abovementioned various embodiments.

The technical solutions recorded by the embodiments of the present document may be freely combined with each other under the condition of no conflicts.

In several embodiments provided by the present document, it should be understood that the disclosed methods and intelligent equipments may be implemented in other manners. The equipment embodiments described above are only schematic. For example, division of the units is only logic function division, and other division manners may be adopted during practical implementation. For example, multiple units or components may be combined or integrated into another system, or some characteristics may be neglected or not executed. In addition, coupling or direct coupling or communication connection between all displayed or discussed components may be through some interfaces, and indirect coupling or communication connection between the equipments or the units may be electrical or mechanical, or may adopt other forms.

The abovementioned units described as separate components may or may not be physically separated, and the components displayed as units may or may not be physical units, that is, they may be located in the same place, or may also be distributed to multiple network units. Part or all of the units may be selected to achieve the purpose of the solution of the embodiment according to a practical requirement.

In addition, various function units in various embodiments of the present document may be integrated into a processing unit, or each unit may also act as one unit independently, or two or more than two units may also be integrated into one unit. The abovementioned integrated unit may be implemented in a hardware form, and may also be implemented in form of hardware and software function unit.

The above embodiments are only the specific implementation modes of the present document and not intended to limit the scope of protection of the present document. Any variations and replacements apparent to those skilled in the art within the technical scope disclosed by the present document shall fall within the scope of protection of the present document.

INDUSTRIAL APPLICABILITY

According to the present document, a corresponding resource is applied for an application according to a service request of the application, and a corresponding application engine or application extension function is determined for the application, to implement orchestration of SDN services; thereby, improving quality of the SDN service and providing better service experiences for users.

What I claim is:

1. A service orchestration method in a Software Defined Networking, SDN, wherein the SDN comprises an application layer and a controller layer, the method comprises:
   determining whether a current SDN open network platform resource meets an SDN open network platform resource requested by an SDN application or not after receiving, through the application layer, a request of using the SDN open network platform resource sent from the SDN application via an external application interface, further determining whether an application engine function and an application extension function in the application layer meet an execution of the SDN application or not when the resource requested by the SDN application is met, and loading the application engine function or the application extension function when the execution of the SDN application is met; and
   applying for the resource required by the SDN application from a controller layer of the SDN according to the request of the SDN application, and allocating the applied resource to the loaded application engine function or application extension function.

2. The method according to claim 1, further comprising:
   performing charging according to the resource consumed by the SDN application and a pricing strategy and pricing mechanism of the SDN application, generating a bill, and outputting a bill result.

3. The method according to claim 1, before receiving a request of using the SDN open network platform resource sent from the SDN application via an external application interface, the method further comprising:
   initializing orchestration management information, orchestration backup information and orchestration extension information in the SDN, and setting an initial state; and
   acquiring network synchronization information from the controller layer.

4. The method according to claim 1, after allocating the applied resource to the loaded application engine function or application extension function, the method further comprising:
   maintaining a current running state, keeping information synchronization with the controller layer, managing orchestration information, backing up the orchestration information, monitoring whether an orchestration extension operation is required to be performed or not, and performing a corresponding orchestration extension when the orchestration extension operation is required to be performed.

5. A service orchestration apparatus in a Software Defined Networking, SDN, the SDN comprising an application layer and a controller layer, wherein the service orchestration apparatus comprises a processor and a memory storing instructions which are executable by the processor, wherein the instructions comprise an application engine function module and an application extension function module disposed in the application layer, wherein, the application engine function module is arranged to provide an application engine capability for the application layer of the SDN, and the application extension function module is arranged to extend a core function of the controller layer to provide an application; and, the instructions further comprises: a receiving unit, a first determination unit, a second determination unit, a loading unit and a resource applying unit, wherein,
   the receiving unit is arranged to trigger the first determination unit after receiving a request of using an SDN open network platform resource sent from an SDN application via an external application interface;
   the first determination unit is arranged to determine whether a current SDN open network platform resource meets the resource requested by the SDN application or not, and trigger the second determination unit when the resource requested by the SDN application is met;
   the second determination unit is arranged to determine whether the application engine function module and the application extension function module meet an execution of the SDN application or not, and trigger the loading unit when the execution of the SDN application is met;
   the loading unit is arranged to load an application engine function corresponding to the application engine function module or an application extension function corresponding to the application extension function module; and
   the resource applying unit is arranged to apply for the resource required by the SDN application from the controller layer according to the request of the SDN application, and allocate the applied resource to the loaded application engine function or application extension function.

6. The apparatus according to claim 5, the instructions further comprising:
    a bill processing unit, arranged to perform charging according to the resource consumed by the SDN application and a pricing strategy and pricing mechanism of the SDN application, generate a bill, and output a bill result.

7. The apparatus according to claim 6, the instructions further comprising:
    an initialization unit, arranged to initialize orchestration management information, orchestration backup information and orchestration extension information in the SDN, and set an initial state; and
    acquire network synchronization information from the controller layer.

8. The apparatus according to claim 6, the instructions further comprising:
    an orchestration management unit, arranged to maintain a current running state, keep information synchronization with the controller layer, manage orchestration information, back up the orchestration information, monitor whether an orchestration extension operation is required to be performed or not, and perform corresponding orchestration extension when the orchestration extension operation is required to be performed.

9. The apparatus according to claim 5, the instructions further comprising:
    an initialization unit, arranged to initialize orchestration management information, orchestration backup information and orchestration extension information in the SDN, and set an initial state; and
    acquire network synchronization information from the controller layer.

10. The apparatus according to claim 5, the instructions further comprising:
    an orchestration management unit, arranged to maintain a current running state, keep information synchronization with the controller layer, manage orchestration information, back up the orchestration information, monitor whether an orchestration extension operation is required to be performed or not, and perform corresponding orchestration extension when the orchestration extension operation is required to be performed.

11. A non-transitory storage medium, storing a computer program, arranged to execute a service orchestration method in a software defined networking, wherein the software defined networking comprises an application layer and a controller layer, the method comprises:
    determining whether a current SDN open network platform resource meets an SDN open network platform resource requested by an SDN application or not after receiving, through the application layer, a request of using the SDN open network platform resource sent from the SDN application via an external application interface, further determining whether an application engine function and an application extension function in the application layer meet an execution of the SDN application or not when the resource requested by the SDN application is met, and loading the application engine function or the application extension function when the execution of the SDN application is met; and
    applying for the resource required by the SDN application from a controller layer of the SDN according to the request of the SDN application, and allocating the applied resource to the loaded application engine function or application extension function.

* * * * *